Figure 1:
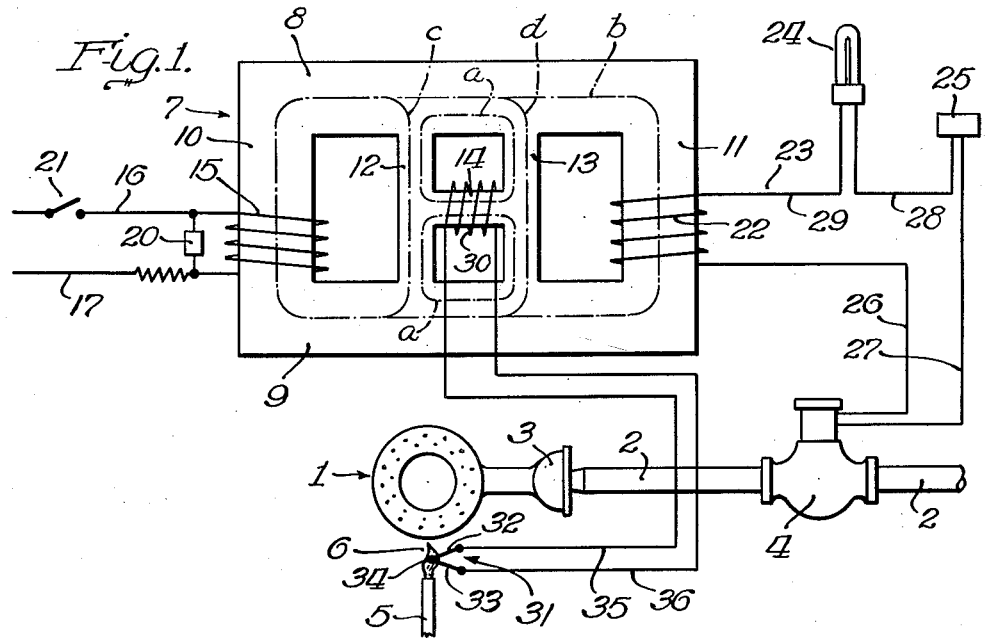

Oct. 2, 1956 P. R. MARVIN 2,765,119
SATURABLE CORE REACTOR WITH THERMISTOR CONTROL
Filed March 7, 1951 3 Sheets-Sheet 1

INVENTOR.
Philip R. Marvin
BY
*Crown, Jackson, Brittelle & Diesem*
Attys.

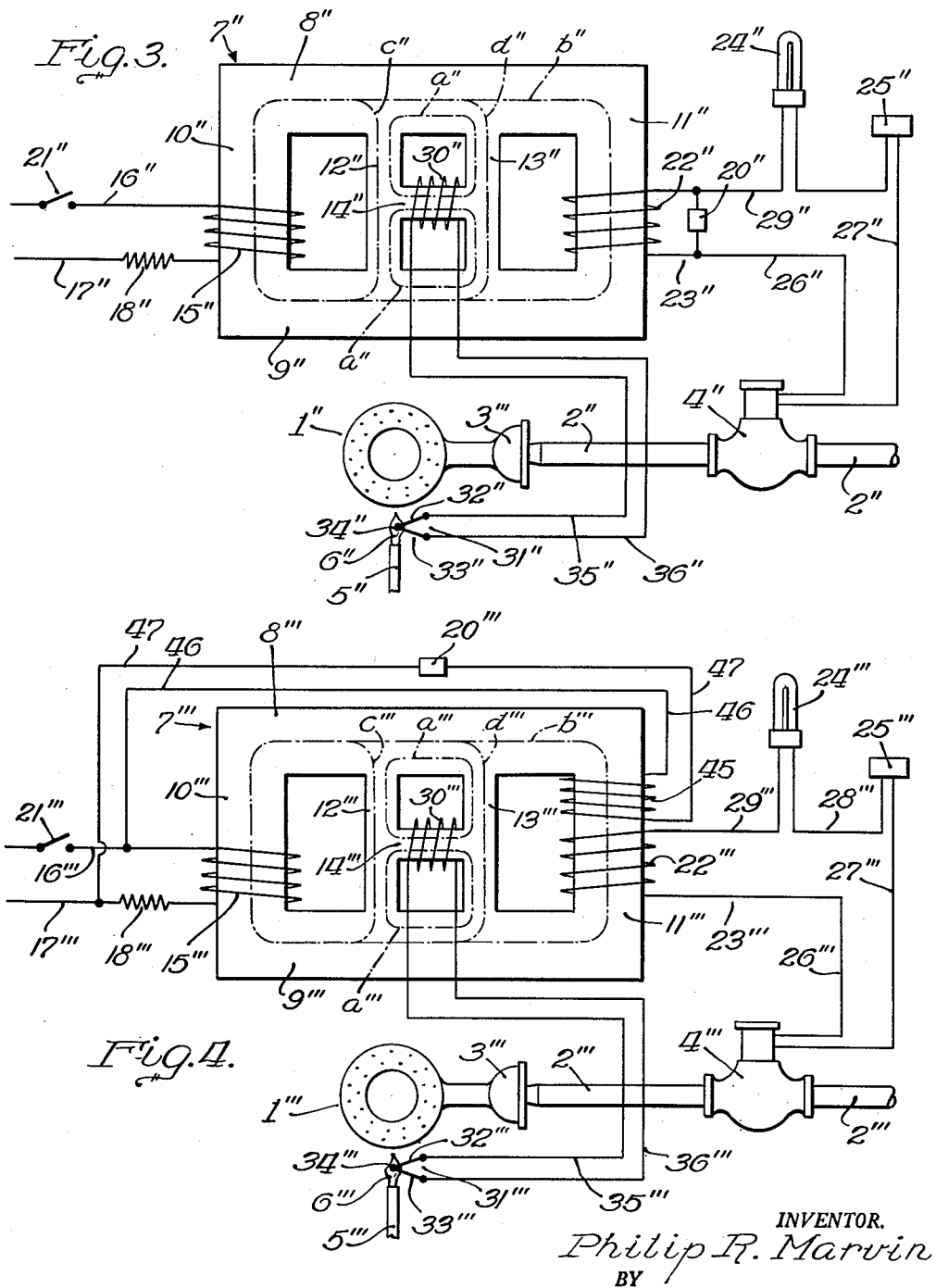

Oct. 2, 1956

P. R. MARVIN 2,765,119

SATURABLE CORE REACTOR WITH THERMISTOR CONTROL

Filed March 7, 1951

3 Sheets-Sheet 3

INVENTOR.
Philip R. Marvin
BY
Attys.

United States Patent Office 2,765,119
Patented Oct. 2, 1956

2,765,119

SATURABLE CORE REACTOR WITH THERMISTOR CONTROL

Philip R. Marvin, Bloomington, Ind., assignor to Milwaukee Gas Specialty Company, Milwaukee, Wis., a corporation of Wisconsin Application March 7, 1951, Serial No. 214,353

9 Claims. (Cl. 236—91)

This invention relates, in general, to control apparatus, and has particular relation to a saturable core reactor with thermistor control for effecting the desired control.

The particular embodiments of the invention which will be described hereinafter in connection with the drawings are employed for interrupting the supply of fuel to a main burner in the event, for example, the ambient temperature at the thermistor location becomes too hot, or a pilot burner for the main burner is extinguished. It is to be understood, however, that the present invention in its broader aspects is not limited to the particular uses shown and described, but may be employed for other purposes as suitable or desired.

One of the main objects of the present invention is to provide a thermistor arrangement for decreasing the output voltage of a saturable core reactor upon the occurrence of a predetermined or undesired condition, whereby to effect the desired control.

Another object of the invention is to provide an improved burner control apparatus wherein the desired control of the gaseous fuel supply for the burner is obtained by a thermistor control of a saturable core reactor.

Another object of the invention is to provide for obtaining the desired control by thermistor control of the input voltage of the saturable core reactor with accompanying decrease in the output voltage.

Another object of the invention is to provide for obtaining the desired control by thermistor control of the output circuit of the saturable core reactor with accompanying decrease in the output voltage.

Another object of the invention is to provide for obtaining the desired control by thermistor control of magnetic flux established in the magnetic core of the saturable core reactor, with accompanying decrease in the output voltage.

Another object of the invention is to provide for obtaining the desired control by thermistor control, responsive to the presence and absence of a pilot burner flame, of the magnetic flux established in the magnetic core of the saturable core reactor with accompanying decrease in the output voltage.

Further features and advantages, and numerous adaptations of the invention will be apparent from the following detailed description and the accompanying drawings.

In the drawings:

Figure 1 is a more or less schematic or diagrammatic view showing one form of control apparatus and controlled means embodying the present invention; and Figures 2, 3, 4, and 5 are similar schematic or diagrammatic views showing other forms of control apparatus and controlled means embodying the present invention.

With reference now to the drawings, in the embodiment of the invention illustrated in Figure 1 the burner shown at 1 is a main burner. It may be the main burner for a room or space heater, or it may be the burner for a water heater or for a floor furnace, an oven burner, one or more top burners, or any other burner, and of any suitable construction.

A fuel supply pipe or conduit 2 leads to the main burner 1 for the delivery of gaseous or other fuel thereto, for example, through a mixing chamber 3 to which air is admitted through adjustable air inlets (not shown), as well understood in the art. The flow of gas through the conduit 2 is controlled by a valve 4 of any suitable electroresponsive or electrically operated type. For purposes of illustration, the valve 4 may be a solenoid valve operated to open position by the flow of electric current through its coil (not shown) and to closed position, for example, by a spring (not shown). Such valves are well known in the art.

The pilot burner 5 is located in juxtaposition to the main burner 1 to maintain a pilot flame 6 for igniting the main burner. The pilot burner 5 may be supplied with gaseous fuel through a pilot fuel supply pipe (not shown) in any suitable or desired manner.

The control apparatus according to the present invention comprises a magnetic core 7 of laminated or other suitable form. The particular core 7 selected for illustration has opposite parallel side legs 8 and 9, end legs 10 and 11, shunt legs 12 and 13 magnetically connecting the side legs 8 and 9 intermediate the end legs 10 and 11, and a leg 14 magnetically connecting the shunt legs 12 and 13 intermediate the side legs 8 and 9.

An alternating current primary winding 15 is wound around the end leg 10 and connected by input conductors 16 and 17, for example, through a suitable transformer (not shown) to a suitable source of alternating current such as a household or commercial current supply line of the type which averages about 115 volts, 60 cycles. The conductor 17 has a resistor 18 therein in series with the winding 15.

A thermistor 20 is connected across the input conductors 16 and 17, for example, between the resistor 18 and the winding 15. The thermistor 20 is positioned where it will be subject to the temperature increase to which the control apparatus is responsive, and has a negative coefficient of resistivity; i. e., it is a non-conductor, or relatively a non-conductor when not heated the required amount, and changes to an electric conductor when heated to the temperature to which the control apparatus responds. A switch 21 may be provided, for example, in the input conductor 16.

A secondary winding 22 is wound around the opposite end leg 11 of the core 7. The winding 22 is connected in series circuit relation in an output circuit 23 which, in the illustrated embodiment of the invention, includes the coil of the electroresponsive valve 4, a thermostat 24, and another control device 25 (which may be a high temperature limit control or other condition responsive control). One terminal of the winding 22 is connected to one terminal of the coil of the valve 4 by a conductor 26. The other terminal of the coil of the valve 4 is connected to one terminal of the control device 25 by a conductor 27. The other terminal of the control device 25 is connected to one terminal of the thermostat 24 by a conductor 28. The other terminal of the thermostat 24 is connected to the other terminal of the winding 22 by a conductor 29.

A direct current winding 30 for controlling the magnetic flux in the core 7 is wound around the magnetic leg 14 of the core 7. The winding 30 is connected in series circuit relation with a thermoelectric generator 31. The thermoelectric generator 31 has thermoelectric generator elements 32 and 33 joined at 34 to form a hot thermojunction which is positioned to be heated by the flame 6 of the pilot burner 5 as long as the pilot burner is ignited. The thermoelectric generator 31 is shown in the form of a thermocouple, but may be in the form of a thermopile or of other suitable form. Lead conductors 35 and 36 connect the thermoelectric generator elements 32 and 33 in circuit with the terminals of the winding 30.

Operation

In the operation of the embodiment of the invention shown in Figure 1, and assuming that the pilot burner 5 is ignited, the pilot burner flame 6 heats the hot thermojunction 34 of the thermoelectric generator 31. Direct and, particularly, thermoelectric current is thus generated and flows through and thermoelectrically energizes the direct current winding 30. This sets up magnetic flux which threads through the core legs 8, 13, 14, and 12, and 14, 12, 9, and 13, as indicated diagrammatically by the dot-and-dash lines a. What might be termed the shunt portion of the core 7 is surrounded or enclosed by the main portion of the core which is thus of the "shell" type.

The alternating current winding 15, being energized, sets up magnetic flux in the core 7. As long as the pilot flame 6 is burning, the greater portion of the magnetic flux set up by the alternating current winding 15 is diverted from the shunt legs 12 and 13 by the magnetic flux set up by the direct current winding 30. As a result, the magnetic flux set up by the alternating current winding 15 completes the long path through the core legs 10, 8, 11, and 9 as indicated diagrammatically by the dot-and-dash line b.

The magnetic flux thus passing through the core leg 11 produces a current in the secondary winding 22, thereby energizing the output circuit 23 which includes the coil of the valve 4, thermostat 24, and control device 25. The energization of the coil of the valve 4 opens this valve and maintains it open for flow of fuel, as long as the pilot burner is ignited, to the main burner 1 which is ignited by the pilot burner 5. The thermostat 24 opens and closes the output circuit 23 with accompanying closing and opening of valve 4 upon occurrence of temperature changes. The high temperature limit control opens the circuit 23 upon occurrence of excessive temperature with accompanying closing of valve 4, and closes the circuit 23, when the temperature is not excessive, with accompanying opening of the valve 4.

Thermistor function

When the temperature surrounding the thermistor 20 becomes too hot, the resistance of this thermistor 20 decreases sufficiently to shunt at least a portion of the alternating current flux away from the winding 15. This allows the output of winding 22 to lower or decrease sufficiently to allow solenoid valve 4 to close and shut off the supply of fuel to the main burner 1. When the temperature surrounding the thermistor 20 cools sufficiently, the output of winding 22 increases sufficiently to open valve 4 for flow of fuel to the main burner 1.

If the flame 6 of pilot burner 5 is extinguished, the direct or thermoelectric circuit 35, 36 (including winding 30) becomes deenergized, and the magnetic flux ceases to be diverted from the shunt legs 12 and 13 by direct current flux. As a result, the alternating current flux set up by the winding 15 then, instead of continuing along the path b, takes the shorter path of less resistance through the shunt legs 12 and 13, as shown by the dot and dash lines c and d, or through at least one of these legs. It is understood that any small amount of flux remaining at this time in leg 11 is insufficient to open electric valve 4, or to maintain this valve open. The shifting of the alternating current flux from the leg 11 to one or both shunt legs 12 and 13 is produced by extinguishment of the pilot burner flame 6. As a result, the winding 22 and its output circuit 23 are deenergized, and valve 4 operates to closed position, for example, by a spring, or otherwise as desired, to shut off the supply of fuel to the main burner 1.

It is understood that the core legs 8 and 9 are preferably proportioned relative to the shunt legs 12 and 13, so that while energization of winding 30 diverts the alternating current flux from the shunt legs 12 and 13, this flux is at such time free to pass through the core legs 10, 8, 11, and 9 along the dot-and-dash line b.

Figure 2:
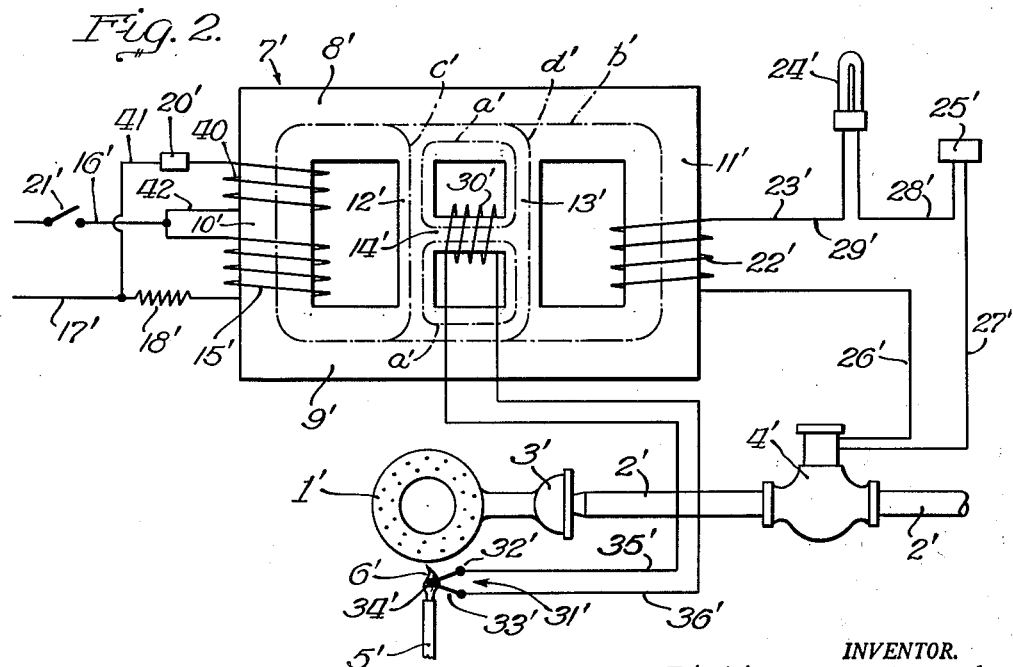

The embodiment of the invention illustrated in Figure 2 is similar to the embodiment illustrated in Figure 1, except that there is wound around the end leg 10' of the core 7' a second alternating current winding 40 which sets up in the core 7' magnetic flux which opposes the magnetic flux set up by the primary winding 15'.

The remaining parts of the apparatus shown in Figure 2 are similar to those shown and described in connection with Figure 1, and are designated by primed reference characters corresponding to those used in Figure 1. The terminals of the winding 40 are connected to the input conductors 16' and 17' by conductors 41 and 42.

The thermistor 20' is interposed in the circuit for the winding 40, for example, by connecting it in circuit with the conductor 41. The thermistor 20' is positioned where it is subject to the temperature increase to which the control apparatus is responsive, and has a negative coefficient of resistivity; i. e., it is a non-conductor, or relatively a non-conductor, when not heated the required amount, and changes to an electric conductor when heated to the temperature to which the control apparatus responds.

Operation

The operation of the apparatus shown in Figure 2 is similar to the operation of the apparatus shown in Figure 1 except that when the ambient temperature surrounding thermistor 20' becomes too hot, the resistance of thermistor 20' is decreased sufficiently to allow enough alternating current to flow through the winding 40—whose flux opposes that of winding 15'—to decrease the output voltage in circuit 23' sufficiently to cause solenoid valve 4' to become deenergized and operate to closed position to shut off the flow of fuel to the burner 1'.

The embodiment of the invention illustrated in Figure 3 is similar to the embodiment illustrated in Figure 1, except that the thermistor 20'' is connected across the output conductors 29'' and 26'' of the output circuit 23'', instead of being connected across the input conductors 16'' and 17''.

The remaining parts of the apparatus shown in Figure 3 are similar to those shown and described in connection with Figure 1, and are designated by double-primed reference characters corresponding to those used in Figure 1. The thermistor 20'' is positioned where it will be subject to the temperature increase to which the control apparatus is responsive, and has a negative coefficient of resistivity; i. e., it is a non-conductor, or relatively a non-conductor, when not heated the required amount, and changes to an electric conductor when heated to the temperature to which the control apparatus responds.

Operation

The operation of the apparatus shown in Figure 3 is similar to the operation of the apparatus shown in Figure 1, except that when the ambient temperature surrounding thermistor 20'' becomes too hot, the resistance of thermistor 20'' is decreased sufficiently to shunt at least a portion of the alternating current output power away from the solenoid valve 4'', causing it to operate to closed position to shut off the supply of gas to the burner 1''.

The embodiment of the invention illustrated in Figure 4 is similar to the embodiment illustrated in Figure 1, except that there is wound around the end leg 11''' of the core 7''' an alternating current input winding 45 which sets up in the core leg 11''' magnetic flux which opposes the magnetic flux from winding 15'''.

The remaining parts of the apparatus shown in Figure 4 are similar to those shown and described in connection with Figure 1, and are designated by triple-primed reference characters corresponding to those used in Figure 1.

The terminals of the winding 45 are connected to the input conductors 16''' and 17''' by conductors 46 and 47.

The thermistor 20''' is interposed in the circuit for the winding 45, for example, by connecting it in circuit with the conductor 47. The thermistor 20''' is positioned where it will be subject to the temperature increase to which the control apparatus is responsive, and has a negative coefficient of resistivity; i. e., it is a non-conductor, or relatively a non-conductor, when not heated the required amount, and changes to an electric conductor when heated to the temperature to which the control apparatus responds.

*Operation*

The operation of the apparatus shown in Figure 4 is similar to the operation of the apparatus shown in Figure 1 except that when the ambient temperature surrounding thermistor 20''' becomes too hot, the resistance of thermistor 20''' decreases sufficiently to cause alternating current to flow in the winding 45. The flux of the winding 45 opposes that in leg 11''' from winding 15''' and causes the output of winding 22''' to decrease sufficiently to deenergize solenoid valve 4'''. This valve then operates to closed position to shut off the supply of fuel to the burner 1'''.

Figure 5:
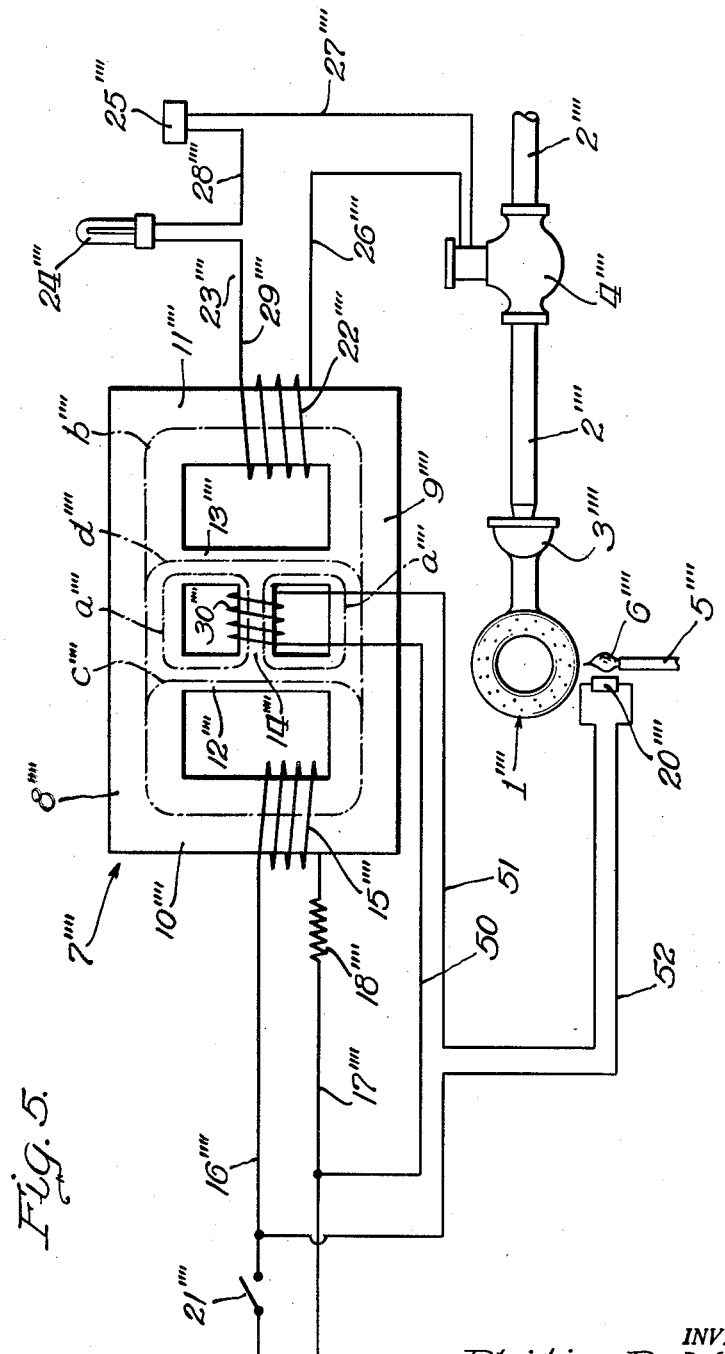

The embodiment of the invention illustrated in Figure 5 is similar to the embodiment illustrated in Figure 1, except that the thermoelectric circuit is omitted and winding 30'''' and thermistor 20'''' are connected in circuit with the alternating current input conductors 16'''' and 17''''.

The remaining parts of the apparatus shown in Figure 5 are similar to those shown and described in connection with Figure 1, and are designated by quadruple-primed reference characters corresponding to those used in Figure 1. One terminal of winding 30'''' is connected to alternating current input conductor 17'''' by a conductor 50. The other terminal of winding 30'''' is connected to one terminal of thermistor 20'''' by a conductor 51. The other terminal of thermistor 20'''' is connected to the other alternating current input conductor 16'''' by a conductor 52.

The thermistor 20'''' is positioned where it will be subject to the heat of the pilot flame 6'''' and has a negative coefficient of resistivity; i. e., it is a non-conductor, or relatively a non-conductor, when not heated the required amount and changes to an electric conductor when heated to the temperature to which the control apparatus responds.

*Operation*

The operation of the apparatus shown in Figure 5 is similar to the operation of the apparatus shown in Figure 1, except that when the ambient temperature surrounding thermistor 20'''' decreases (i. e., when pilot burner flame 6'''' is extinguished) the resistance of the thermistor 20'''' increases sufficiently to reduce the current flowing in winding 30'''' so that the flux paths 12'''' and 13'''' are no longer saturated. This reduces the flux linking winding 22'''' sufficiently to reduce the output voltage applied to solenoid valve 4'''' so that it will operate to closed position and shut off the supply of gas to the burner 1''''.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. Control apparatus for controlling a flow of fluid comprising, in combination, a magnetic structure comprising a magnetically permeable looped path provided with a first portion having an alternating current input winding thereon and a second portion having an output winding thereon, an electroresponsive device for controlling the flow of fluid, an output circuit connecting said output winding in circuit with said device, an input circuit connected to said input winding for establishing magnetic flux in said looped path to produce in said output winding electric current for energizing said device, a magnetically permeable shunt path connected across said magnetically permeable looped path between said input and output windings for shunting the magnetic flux from said second portion of said looped path to deenergize said device, a third winding for establishing magnetic flux in said shunt path, a third circuit connected to said third winding for energizing said third winding, and a thermistor having a negative coefficient of resistivity and connected in shunt circuit relation with respect to one of said input, output and third windings; also in shunt circuit relation with respect to the electric energy for said electroresponsive device and effective when heated to deenergize said electroresponsive device and when cooled to permit energization of said electroresponsive device.

2. Control apparatus for controlling a flow of fluid comprising, in combination, a magnetic structure comprising a magnetically permeable looped path provided with a first portion having an alternating current input winding thereon and a second portion having an output winding thereon, an electroresponsive valve for controlling the flow of fluid, an output circuit connecting said output winding in circuit with said valve, an input circuit connected to said input winding for establishing magnetic flux in said looped path to produce in said output winding electric current for energizing said valve, a magnetically permeable shunt path connected across said magnetically permeable looped path between said input and output windings for shunting the magnetic flux from said second portion of said looped path to deenergize said valve, a third winding for establishing magnetic flux in said shunt path to divert the magnetic flux established by said input winding to said second portion of said looped path, a thermoelectric generator connected in circuit with said third winding for energizing said third winding, and a thermistor having a negative coefficient of resistivity; also responsive to ambient temperature and connected in shunt circuit relation with respect to one of said input, output and third windings; also in shunt circuit relation with respect to the electric energy for said electroresponsive valve and effective when heated to deenergize said electroresponsive valve and when cooled to permit energization of said electroresponsive valve.

3. Control apparatus according to claim 2 wherein the thermistor is connected across the input circuit in shunt relation with respect to said input winding.

4. Control apparatus according to claim 2 wherein the thermistor is connected across the output circuit in shunt relation with respect to said output winding and ahead of the valve.

5. Control apparatus for controlling a flow of fluid comprising, in combination, a magnetic structure comprising a magnetically permeable looped path provided with a first portion having an alternating current input winding thereon and a second portion having an output winding thereon, an electroresponsive valve for controlling the flow of fluid, an output circuit connecting said output winding in circuit with said valve, an input circuit connected to said input winding for establishing magnetic flux in said looped path to produce in said output winding electric current for energizing said valve, a magnetically permeable shunt path connected across said magnetically permeable looped path between said input and output windings for shunting the magnetic flux from said second portion of said looped path to deenergize said valve, a third winding for establishing magnetic flux in said shunt path to divert the magnetic flux established by said input winding to said second portion of said looped path, a thermoelectric generator connected in circuit with said third winding for energizing said third winding, a thermistor having a negative coefficient of resistivity; also responsive to ambient temperature and connected in circuit with one of said input and output circuits for reducing, upon a rise in ambient temperature, the magnetic flux in said second portion of said looped path sufficiently to deenergize said valve, and a fourth winding connected in circuit with said thermistor and disposed on one of the first and second portions of said magnetically permeable looped path for establishing magnetic flux in said looped path portion in opposition to the magnetic flux established by the other winding on said looped path portion.

6. Control apparatus for controlling a flow of fluid comprising, in combination, a magnetic structure comprising a magnetically permeable looped path provided with a first portion having an alternating current input winding thereon and a second portion having an output winding thereon, an electroresponsive valve for controlling the flow of fluid, an output circuit connecting said output winding in circuit with said valve, an input circuit connected to said input winding for establishing magnetic flux in said looped path to produce in said output winding electric current for energizing said valve, a magnetically permeable shunt path connected across said magnetically permeable looped path between said input and output windings for shunting the magnetic flux from said second portion of said looped path to deenergize said valve, a third winding for establishing magnetic flux in said shunt path to divert the magnetic flux established by said input winding to said second portion of said looped path, a thermoelectric generator connected in circuit with said third winding for energizing said third winding, a thermistor having a negative coefficient of resistivity; also responsive to ambient temperature and connected in circuit with one of said input and output circuits for reducing, upon a rise in ambient temperature, the magnetic flux in said second portion of said looped path sufficiently to deenergize said valve, and a fourth winding connected in circuit with said thermistor and disposed on said first portion of said magnetically permeable looped path for establishing magnetic flux in said looped path portion in opposition to the magnetic flux established by the other winding on said looped path portion.

7. Control apparatus for controlling a flow of fluid comprising, in combination, a magnetic structure comprising a magnetically permeable looped path provided with a first portion having an alternating current input winding thereon and a second portion having an output winding thereon, an electroresponsive valve for controlling the flow of fluid, an output circuit connected to said output winding in circuit with said valve, an input circuit connected to said input winding for establishing magnetic flux in said looped path to produce in said output winding electric current for energizing said valve, a magnetically permeable shunt path connected across said magnetically permeable looped path between said input and output windings for shunting the magnetic flux from said second portion of said looped path to deenergize said valve, a third winding for establishing magnetic flux in said shunt path to divert the magnetic flux established by said input winding to said second portion of said looped path, a thermoelectric generator connected in circuit with said third winding for energizing said third winding, a thermistor having a negative coefficient of resistivity; also responsive to ambient temperature and connected in circuit with one of said input and output circuits for reducing, upon a rise in ambient temperature, the magnetic flux in said second portion of said looped path sufficiently to deenergize said valve, and a fourth winding connected in circuit with said thermistor and disposed on said second portion of said magnetically permeable looped path for establishing magnetic flux in said looped path portion in opposition to the magnetic flux established by the other winding on said looped path portion.

8. Control apparatus comprising, in combination, a magnetic structure comprising a magnetically permeable looped path provided with a first portion having an alternating current input winding thereon and a second portion having an output winding thereon, an electroresponsive device, an output circuit connecting said output winding in circuit with said device, an input circuit connected to said input winding for establishing magnetic flux in said looped path to produce in said output winding electric current for energizing said device, a magnetically permeable shunt path connected across said magnetically permeable looped path between said input and output windings for shunting the magnetic flux from said second portion of said looped path to deenergize said device, a third winding for establishing magnetic flux in said shunt path, a third circuit connected to said third winding for energizing said third winding, and a thermistor having a negative coefficient of resistivity and connected in shunt circuit relation with respect to one of said input, output and third windings; also in shunt relation with respect to the energy for said electroresponsive device and effective when heated to deenergize said electroresponsive device and when cooled to permit energization of said electroresponsive device.

9. Control apparatus comprising, in combination, a magnetic structure comprising a magnetically permeable looped path provided with a first portion having an alternating current input winding thereon and a second portion having an output winding thereon, an electroresponsive device, an output circuit connecting said output winding in circuit with said device, an input circuit connected to said input winding for establishing magnetic flux in said looped path to produce in said output winding electric current for energizing said device, a magnetically permeable shunt path connected across said magnetically permeable looped path between said input and output windings for shunting the magnetic flux from said second portion of said looped path to deenergize said device, a third winding for establishing magnetic flux in said shunt path, a third circuit connected to said third winding for energizing said third winding, and a thermistor having a negative coefficient of resistivity and connected in shunt circuit relation with respect to said third winding; also in shunt circuit relation with respect to said input winding and effective when heated to deenergize said electroresponsive device and when cooled to permit energization of said electroresponsive device.

References Cited in the file of this patent

UNITED STATES PATENTS

| | | |
|---|---|---|
| 1,858,265 | Dahlstrom | May 17, 1932 |
| 2,057,383 | Kroger | Oct. 13, 1936 |
| 2,207,234 | Bohm | July 9, 1940 |
| 2,260,012 | Edwards | Oct. 21, 1941 |
| 2,306,578 | Wetzel | Dec. 29, 1942 |